US007436766B2

(12) United States Patent
Alfano et al.

(10) Patent No.: US 7,436,766 B2
(45) Date of Patent: *Oct. 14, 2008

(54) TELECOMMUNICATION NETWORK SUPPORT FOR SERVICE BASED POLICY IN ROAMING CONFIGURATIONS

(75) Inventors: Frank M. Alfano, Wheaton, IL (US); Peter J. McCann, Naperville, IL (US); Thomas T. Towle, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 319 days.

This patent is subject to a terminal disclaimer.

(21) Appl. No.: 11/098,105

(22) Filed: Apr. 4, 2005

(65) Prior Publication Data

US 2006/0250956 A1  Nov. 9, 2006

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |

(52) U.S. Cl. .................. 370/230; 370/252; 370/341; 370/392; 455/435.1; 455/445; 455/452.2; 709/223; 709/229

(58) Field of Classification Search .......... 370/230, 370/252, 253, 331, 341, 392, 401; 455/414.1, 455/435.1, 445, 452.2; 709/223, 229
See application file for complete search history.

(56) References Cited

U.S. PATENT DOCUMENTS

| | | | | |
|---|---|---|---|---|
| 6,907,047 | B2 * | 6/2005 | Chen et al. | 370/467 |
| 7,027,818 | B2 * | 4/2006 | Bos et al. | 455/452.2 |
| 7,120,156 | B2 * | 10/2006 | Foti et al. | 370/401 |
| 2004/0073686 | A1 * | 4/2004 | Hurta | 709/229 |
| 2004/0146040 | A1 | 7/2004 | Son et al. | |
| 2004/0165594 | A1 | 8/2004 | Faccin et al. | |
| 2005/0238002 | A1 * | 10/2005 | Rasanen | 370/352 |
| 2006/0141995 | A1 * | 6/2006 | Purnadi et al. | 455/414.1 |

FOREIGN PATENT DOCUMENTS

EP    1 250 023 A    10/2002

OTHER PUBLICATIONS

ETSI TS 123 228; Digital Cellular Telecommunications System (Phase 2+) Universal Mobile Telecommunications System (UMTS); IP Multimedia Subsystem (IMS); Stage 2.
ETSI Standards, European Telecommunications Standards Institute; Dec. 2002; pp. 1-130; vol. 3-SA2, No. V570; ETSI; Sophia-Antipo, France.

* cited by examiner

*Primary Examiner*—Matthew Anderson
*Assistant Examiner*—Shaima Q Aminzay

(57) ABSTRACT

An apparatus in one example may have a functionality of a policy decision function divided into two parts; one part representing a home network application function and the other part representing visited network bearer resources and local policies. The one part of the policy decision function supports communications with the application function, and represents the home network and application in a request for QoS control to the visited network. The other part of the policy decision function supports visited network interactions with a policy enforcement function, and represents visited network local policy related to resource utilization and roaming agreement-based policy.

20 Claims, 3 Drawing Sheets

TELECOMMUNICATION NETWORK SUPPORT FOR SERVICE BASED POLICY IN ROAMING CONFIGURATIONS

TECHNICAL FIELD

The invention relates generally to telecommunication systems and more particularly to a policy control from an application that may be supported in a roaming configuration while preserving home based service control and not requiring bearers to traverse a home network.

BACKGROUND

The IP Multi-Media Subsystem (IMS) is an IP multimedia and telephony core network. It is defined by 3GPP and 3GPP2 standards and organizations based on IETF Internet protocols. IMS is access independent as it supports IP to IP session over wireline IP, 802.11, 802.15, CDMA, packet data along with GSM/EDGE/UMTS and other packet data applications. IMS is standardized reference architecture. IMS consists of session control, connection control and an applications services framework along with subscriber and services data. It enables new converged voice and data services, while allowing for the interoperability of these converged services between subscribers. IMS network infrastructure enables the convergence of data, speech, and mobile network technologies over an IP-based infrastructure.

Designed to fill the gap between existing traditional telecommunications technologies and the Internet, IMS provides the key functionalities required to enable new IP services via mobile networks taking into account the complexity of multimedia, constraints of the underlying network, managing mobility and the multitude of emerging applications. IMS permits and enhances real time, multimedia mobile services such as rich voice, video telephony, messaging, conferencing and push services by responding to the emerging trend to move toward a common, standardized subsystem. IMS services may include Push-to-Talk-over-Cellular, real time video sharing, interactive gaming, Instant Messaging Services, voice messaging, voice and video telephony, and video-conferencing.

Quality of service is commonly defined as the service users' degree of satisfaction during a given communications session. Consistently anticipating and meeting users' quality of service needs is what distinguishes successful communications service and product providers from their competition.

Network Services are considered end-to-end, this means from a Terminal Equipment (TE) to another TE. An End-to-End Service may have a certain Quality of Service (QoS), which is provided for the user of a network service. It is the user that decides whether he is satisfied with the provided QoS or not.

To realize a certain network QoS, a bearer service with clearly defined characteristics and functionality is to be set up from the source to the destination of a service. The bearer service includes all aspects to enable the provision of a contracted QoS. These aspects are among others the control signaling, user plane transport and QoS management functionality. A bearer service layered architecture may be used where each bearer service on a specific layer offers its individual services using services provided by the layers below.

Cellular telephony networks today are introducing higher bandwidth technologies in the access. Combined with higher access speeds, the core network is moving to using packet-based connectionless transports for services. With the advent of the IP Multimedia Subsystem (IMS), home based service control for multimedia applications is becoming a reality. Voice over IP (VoIP) and other QoS sensitive multimedia applications are being deployed and thus there is a new need for these applications to be able to manage their QoS needs.

In particular, known policy control from an application is supportable in a roaming configuration while preserving home-based service control. It is a drawback of the known systems that bearers are required to traverse the home network.

Thus, a need exists for policy control from an application that may be supported in a roaming configuration while preserving the home based service control and not requiring bearers to traverse the home network.

SUMMARY

The invention in one implementation encompasses an apparatus. The apparatus comprises a functionality of a policy decision function divided into two parts; one part representing a home network application function and the other part representing visited network bearer resources and local policies. The one part of the policy decision function supports communications with the application function, and represents the home network and application in a request for QoS control to the visited network. The other part of the policy decision function supports visited network interactions with a policy enforcement function, and represents visited network local policy related to resource utilization and roaming agreement-based policy.

Another implementation of the invention encompasses a method. This implementation of the method may comprise: endpoints communicating via an application function (AF) in a home network while negotiating a quality of service (QoS) for an end-to-end multimedia session; the AF communicating with an AF side policy decision function (A-PDF) to provide the negotiated QoS to use as a limit on a requested QoS for the session; requesting, by a terminal at one of the endpoints, from a policy enforcement function (PEF) a QoS managed bearer; checking the requested QoS with a PEF side policy decision function (P-PDF) to determine if the requested QoS falls within a current policy; determining, by the P-PDF, that the terminal is roaming based on identification information and contacting the A-PDF in the home network, also based on the identification information; determining, by the A-PDF, the home network policy based on AF inputs and providing the home network policy to the P-PDF; determining, by the P-PDF, the home network policy based on AF inputs and providing the home network policy to the PEF; responding, by the PEF, if the home network policy is to allow the end-to-end multimedia session, with a success to the terminal; and creating a bearer for the end-to-end multimedia session.

DESCRIPTION OF THE DRAWINGS

Features of exemplary implementations of the invention will become apparent from the description, the claims, and the accompanying drawings in which:

DETAILED DESCRIPTION

Figure 1:
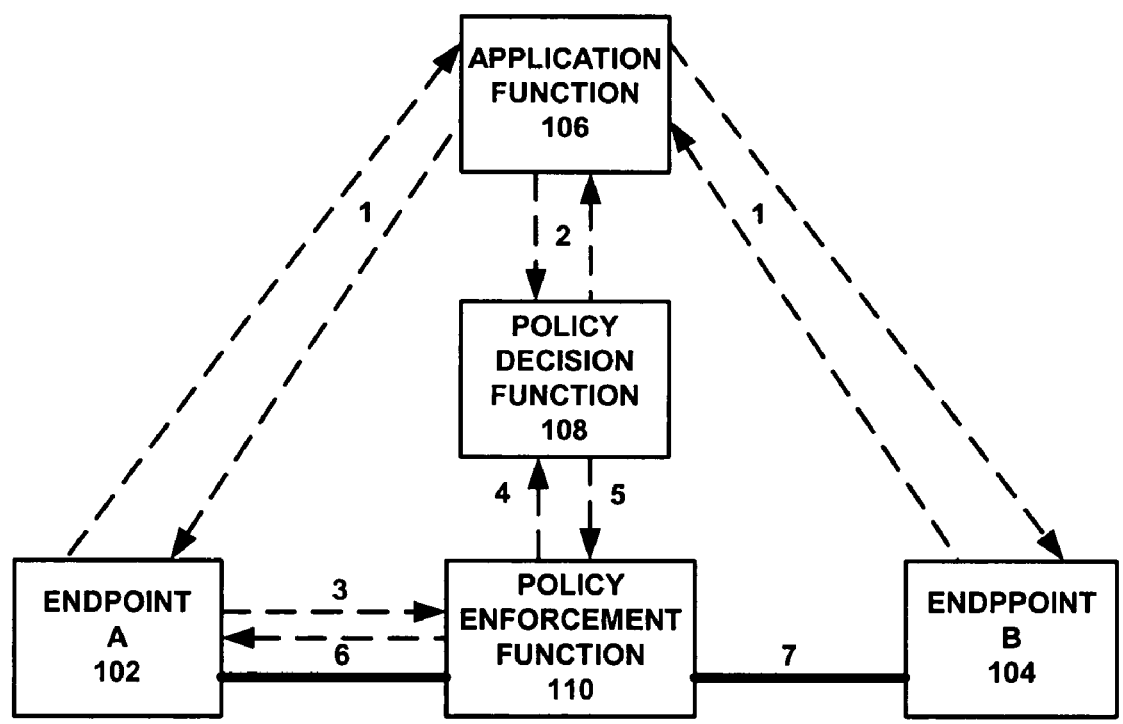
FIG. 1 is a representation of one known cellular system for QoS management.

The IP Multimedia Subsystem (IMS) is an enabler for many promising services based on the Internet Protocol (IP). Typically, the value-added IP services that will be offered through IMS are Quality of Service (QoS) sensitive. To support such services, the IMS architecture, defined in Third Generation Partnership Project (3GPP) release 5, introduces IMS-specific QoS mechanisms and service-based local policy control.

The IMS architecture adds functionality to the Universal Mobile Telecommunications System (UMTS) network, which is a true enabler for IP multimedia services, such as voice over IP, video and messaging services. This architecture relies on the concept of separating the IP data plane and the session control plane, based on the use of the Internet Engineering Task Force Session Initiation Protocol (IETF SIP), plus a minimum of 3GPP-specific SIP extensions accepted by the IETF. Support for IMS requires new network elements and interworking functions, such as the IMS-PSTN (Public Switched Telephone Network) interworking gateways. It also requires additional functionality in the User Equipment (UE).

The large scale introduction of IP multimedia services in the packet-switched domain puts additional demands on the QoS infrastructure provided by the UMTS bearer service. However, providing QoS to IMS services is not just a bearer level issue. Not only is there a need to involve the session layer in QoS control, but also to coordinate the bearer and session layer QoS.

Policy control enables an operator to control the user's access to network resources for IMS and non-IMS services, based on time-of-day, type of media, and so on. The PDF provides the capabilities needed to apply this service-based policy control in the UMTS access network.

In order to offer chargeable "carrier grade" services, it is important for an operator to correlate the QoS requested at the session layer (through session control signaling, such as SIP) with the actual QoS provided at the bearer level (PDP context activation). An important new feature of the IMS architecture is therefore the linkage between the session layer (SIP) and the UMTS bearer layer. For this purpose, the PDF is equipped with a policy control interface (Go), based on the Common Open Policy Service (COPS), which enables an operator to enforce policies on the PDP contexts in the GGSN.

The PDF is a policy decision point (in COPS terminology), while the GGSN hosts a policy enforcement function. The latter can police packet flows and restrict the set of IP destinations that can be reached through a PDP context according to packet filters. The binding between the media components specified at the session layer and the corresponding PDP contexts maintained at the GGSN, is ensured by using an authorization token. One authorization token is assigned per IMS (SIP) session; each media component (e.g. video or audio) in a SIP session is identified by a sequence number. The PDF has an interface with the Application Function (AF) on the service side and with the GGSN on the network side.

The AF controls applications that need to use IP bearer resources (e.g. UMTS packet-switched domain resources). It represents the application level intelligence for any service running over the IP bearer that needs service-based policy control.

The PDF makes policy decisions based on session and media related information obtained from the AF. At the heart of the PDF is a policy server, which stores the policy information; the granularity of this information is decided by the operator. For example, policy information can relate to all Access Point Names (APN) that are reachable via the UMTS network, or only to a given APN. Policy information is defined by the mobile operator.

The GGSN is the policy enforcement point for policy decisions made by the PDF. On receipt of connection requests (creation of PDP context), the GGSN sends requests and receives decisions from the PDF, the main functions of which are: authorization of session QoS resources; resource reservation; session release; and correlation of charging information.

In the initial interaction between the AF and the PDF, the AF provides the PDF with the media-related information (session requirements) to be used for the session. Based on the policy information contained in the policy server, the PDF authorizes (accepts or rejects) the use of QoS resources and provides the AF with the binding information to be used for PDP context creation.

The present method and apparatus may be utilized with other systems employing IMS as well as UMTS systems. For example, the present method and apparatus may be utilized with cdma2000 systems employing IMS.

When the GGSN receives a request for PDP context activation, it requests authorization from the PDF via the Go interface. The authorization token provided during the authorization of session QoS resources is used as the mechanism to enable the GGSN to contact the PDF that generated it. First, the PDF verifies that the PDP context activation request corresponds to an ongoing session. Second, it verifies that the requested bearer QoS corresponds to media resource information authorized by the AF. And third, it interacts with the GGSN to authorize the required QoS resources. The PDF provides the following information to the GGSN: QoS class to be used for the PDP context; data rate information authorized for the PDP context; and packet classifier.

The current standards for cellular systems address the need for QoS management using what is called Service Based Local Policy (SBLP) control. In such a system (as shown in FIG. 1), the endpoints 102, 104 of a communications session, communicate via an Application Function (AF) 106 while negotiating the QoS for their end-to-end multimedia session (step 1). Once the negotiation is complete the AF 106 communicates with a Policy Decision Function (PDF) 108 to provide the negotiated QoS to use as a limit on the QoS requested by the user for this session (step 2). When the terminal A 102 makes a request to the Policy Enforcement Function (PEF) 110 for a QoS managed bearer (step 3), the request is checked with the PDF 108 (step 4) to see if it falls within the current policy as determined by the PDF 108 based on AF inputs and perhaps modulated by local network policy. The local network policy considerations might be based on resource utilization needs or roaming agreements in the case of roaming configurations. The PDF 108 provides the policy decision to the PEF 110 (step 5). If the current policy is to allow the flow, the PEFPl 0 responds with a success to the terminal a 102 (step 6) and the bearer is then created (step 7).

The problem is that the current standards only address the ability to manage bearers in the home network using this method. The PDF must reside in the same network as the AF in order for them to discover each other and to recognize that AF as a valid control entity for the policy decision. The PDF must reside in the same network as the PEF as the owner of the network resources will not allow the policy to be set by another network. Thus all three entities must be in the same network currently.

In some configurations, a visited network is supported by moving all three entities to the visited network. This has the drawback of requiring an AF to be deployed in each of the roaming partner networks thus counteracting the benefits of home control of services. This also places a significant block on the rapid deployment of new services as all partner networks need to be updated as well as the operator's home network.

Having all three entities located in the home network places a requirement on the configuration that the media bearers must all pass through the home network in order to be managed. This configuration also does not address the needs to manage the bearers in the visited network either.

Figure 2:
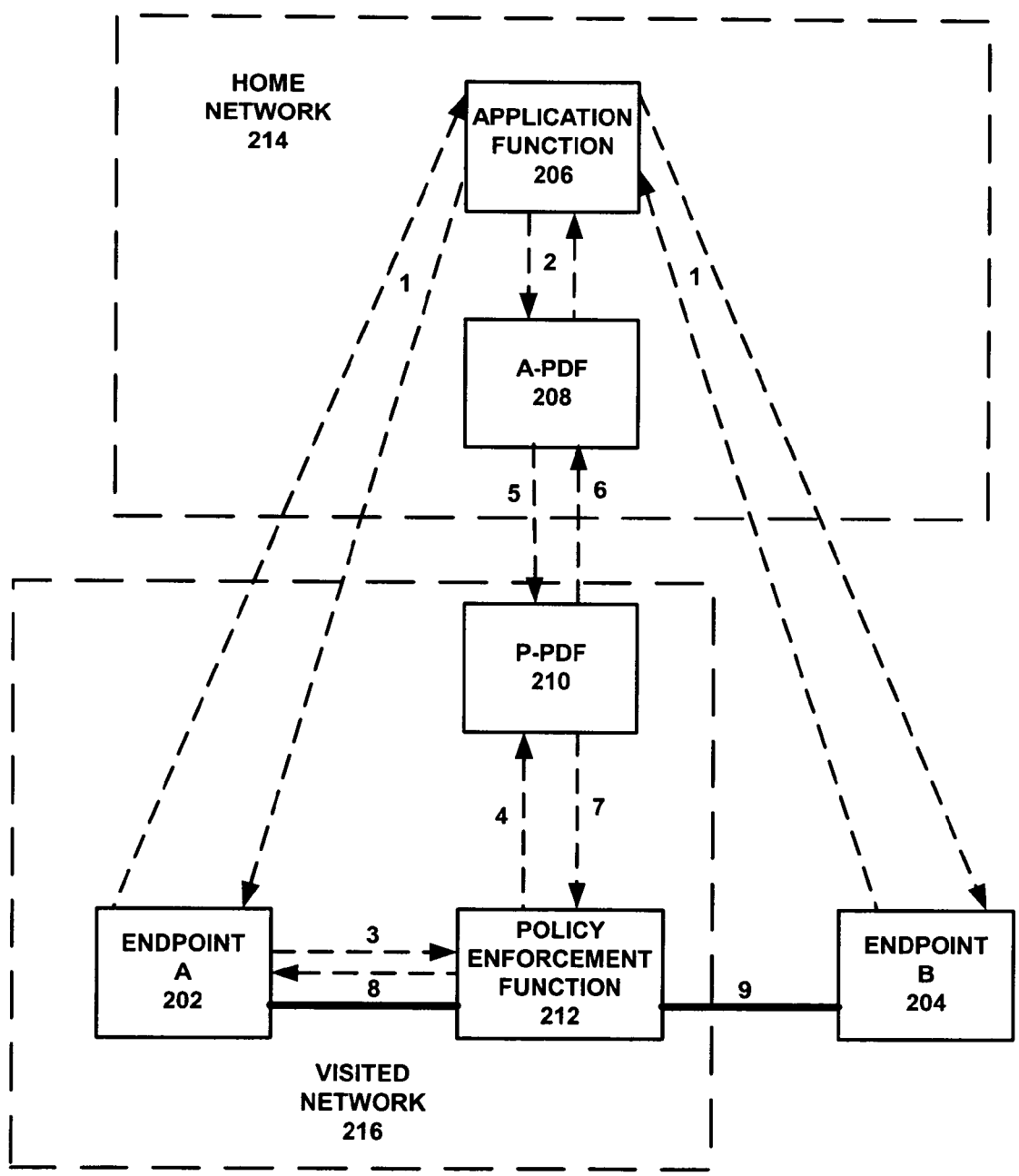
FIG. 2 is a representation of one implementation of an apparatus that comprises network support for service-based policy in roaming configurations.

FIG. 2 depicts one embodiment according to the present method and apparatus. In this exemplary embodiment the Policy Decision Function is split into an AF side PDF (A-PDF 208) and a PEF side PDF (P-PDF 210). Each of these new functional entities supports a part of the overall functionality of the current PDF 208.

The A-PDF 208 supports communications with the AF 206 and represents the home network 214 and application in the request for QoS control to the visited network 216. The P-PDF 210 supports visited network interactions with the PEF 212 and represents the visited network local policy related to resource utilization and roaming agreement-based policy. A secure inter-domain protocol supports the interconnection of the A-PDF 208 and the P-PDF 210 and insures that only one pair of entities need communicate between any two networks.

FIG. 2 also shows the overall operation of the configuration for SBLP. In such a system, the endpoints A and B 202, 204 of a communications session, still may communicate via an Application Function (AF) 206 in the home network 214 while negotiating the QoS for their end-to-end multimedia session (step 1). Once the negotiation is complete the AF 206 communicates with the A-PDF 208 to provide the negotiated QoS to use as a limit on the QoS requested by the user for this session (step 2). When the terminal at the endpoint A 202 makes a request to the Policy Enforcement Function (PEF) 212 for a QoS managed bearer (step 3), the request is checked with the P-PDF 208 to see if it falls within the current policy (step 4). The P-PDF 210 determines that this is a roaming user based on the user's ID and contacts the user's home network A-PDF 208, also based on user ID information (step 5). The A-PDF 208 determines the home network policy based on AF inputs and provides this to the P-PDF 210(step 6). The P-PDF 210 determines a policy based on these inputs and perhaps modulated by local network policy. Again local network policy considerations might be based on resource utilization needs or roaming agreements. The P-PDF 210 provides the policy decision to the PEF 212 (step 7) and, if the current policy is to allow the flow, the PEF 212 responds with a success to the terminal at the endpoint A 202(step 8) and the bearer is then created (step 9).

Embodiments according to the present method and apparatus may divide the functionality of the existing PDF into two parts, one for representing the home network Application Function and one representing the visited network bearer resources and local policies. With these enhancements policy control from an application may be supported in a roaming configuration while preserving the home-based service control and not requiring bearers to traverse the home network. Thus this supports configurations that cannot currently be supported and overcomes the drawbacks of the prior art.

Figure 3:
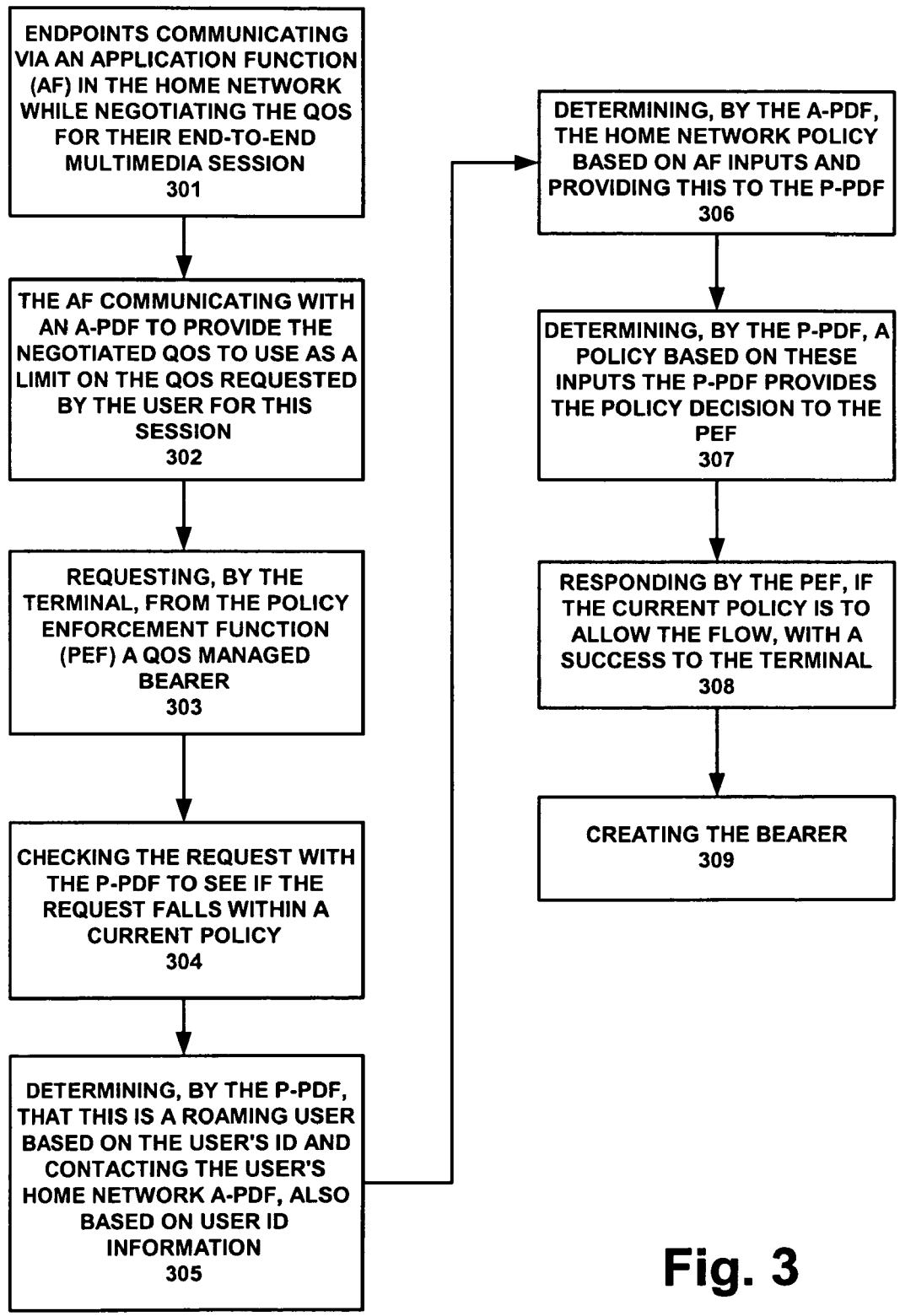
FIG. 3 is a representation of one exemplary method for support for service based policy in roaming configurations.

FIG. 3 depicts a flow diagram of one exemplary embodiment of the present method. In this exemplary embodiment the method may have the following steps: endpoints communicating via an Application Function (AF) in the home network while negotiating the QoS for their end-to-end multimedia session (301); the AF communicating with an A-PDF to provide the negotiated QoS to use as a limit on the QoS requested by the user for this session (302); requesting, by the terminal, from the Policy Enforcement Function (PEF) a QoS managed bearer (303); checking the request with the P-PDF to see if the request falls within a current policy (304); determining, by the P-PDF, that this is a roaming user based on the user's ID and contacting the user's home network A-PDF, also based on user ID information (305); determining, by the A-PDF, the home network policy based on AF inputs and providing this to the P-PDF (306); determining, by the P-PDF, a policy based on these inputs and providing the policy decision to the PEF (307); responding by the PEF, if the current policy is to allow the flow, with a success to the terminal (308); and creating the bearer (309).

As discussed above, the P-PDF may determine a policy based not only on these inputs, but also modulated by local network policy. Again local network policy considerations may be based on resource utilization needs or roaming agreements.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
   a functionality of a policy decision function (PDF) divided into two parts, one part representing a home network application function (AF) and the other part representing visited network bearer resources and local policies; and
   wherein a secure inter-domain protocol supports an interconnection of the one part and the other part so that only the one part and the other part need communicate between a home network and a visited network; and
   wherein a quality of service (QoS) requested at a session layer is correlated with actual QoS provided at a bearer layer using a linkage between the session layer and the bearer layer.

2. The apparatus according to claim 1, wherein the one part of the policy decision function supports communications with the AF and represents the home network and application in a request for QoS control to the visited network, and wherein the other part of the policy decision function supports visited network interactions with a policy enforcement function (PEF) and represents visited network local policy related to resource utilization and roaming agreement based policy.

3. The apparatus according to claim 1, wherein at least two endpoints are operatively coupled to one another via the application function (AF) in a home network, one of the endpoints associated with the home network and located in a visited network, and wherein the application function (AF) is supported in a roaming configuration while preserving home based service control and not requiring bearers for the two end points to traverse the home network.

4. The apparatus according to claim 3, wherein:
   an AF side policy decision function (A-PDF) operatively coupled to the AF via a policy decision function (PDF), the A-PDF located in the home network;
   a PEF side policy decision function (P-PDF) operatively coupled to the one of the endpoints, the P-PDF located in a visited network;

the A-PDF operatively coupled to the P-PDF;
a policy enforcement function (PEF) operatively coupled to the one of the endpoints; and
a QoS managed bearer that is operatively connected to the endpoints.

5. The apparatus according to claim 4, wherein the endpoints communicate via the application function (AF) in the home network while negotiating a QoS for an end-to-end multimedia session.

6. The apparatus according to claim 4, wherein the AF communicates with the AF side policy decision function (A-PDF) to provide a negotiated QoS to use as a limit on a requested QoS for the session.

7. The apparatus according to claim 4, wherein a requested QoS is checked with the PEF side policy decision function (P-PDF) to determine if a requested QoS falls within a current policy.

8. The apparatus according to claim 4, wherein the P-PDF determines that the terminal is roaming based on identification information, and wherein the P-PDF contacts the A-PDF in the home network based on the identification information.

9. The apparatus according to claim 4, wherein the A-PDF determines a home network policy based on AF inputs, and wherein the A-PDF provides the home network policy to the P-PDF.

10. The apparatus according to claim 4, wherein the P-PDF determines a home network policy based on AF inputs, and wherein the P-PDF provides the home network policy to the PEF.

11. An apparatus, comprising:
at least two endpoints operatively coupled to one another via an application function (AF) in a home network, one of the endpoints associated with the home network and located in a visited network;
an AF side policy decision function (A-PDF) operatively coupled to the AF via a policy decision function (PDF), the A-PDF located in the home network;
a PEF side policy decision function (P-PDF) operatively coupled to the one of the endpoints, the P-PDF located in a visited network;
the A-PDF operatively coupled to the P-PDF via a secure inter-domain protocol so that only the A-PDF and the P-PDF need communicate between the home network and the visited network;
a policy enforcement function (PEF) operatively coupled to the one of the endpoints; and
a quality of service (QoS) managed bearer that is operatively connected to the endpoints;
wherein QoS requested at a session layer is correlated with actual QoS provided at a bearer layer using a linkage between the session layer and the bearer layer.

12. The apparatus according to claim 11, wherein the endpoints communicate via the application function (AF) in the home network while negotiating the QoS for an end-to-end multimedia session.

13. The apparatus according to claim 11, wherein the AF communicates with the AF side policy decision function (A-PDF) to provide a negotiated QoS to use as a limit on a requested QoS for the session.

14. The apparatus according to claim 11, wherein a requested QoS is checked with the PEF side policy decision function (P-PDF) to determine if a requested QoS falls within a current policy.

15. The apparatus according to claim 11, wherein the P-PDF determines that the terminal is roaming based on identification information, and wherein the P-PDF contacts the A-PDF in the home network based on the identification information.

16. The apparatus according to claim 11, wherein the A-PDF determines a home network policy based on AF inputs, and wherein the A-PDF provides the home network policy to the P-PDF.

17. The apparatus according to claim 11, wherein the P-PDF determines a home network policy based on AF inputs, and wherein the P-PDF provides the home network policy to the PEF.

18. A method, comprising the steps of:
endpoints communicating via an application function (AF) in a home network while negotiating a quality of service (QoS) for an end-to-end multimedia session;
the AF communicating with an AF side policy decision function (A-PDF) to provide the negotiated QoS to use as a limit on a requested QoS for the session;
requesting, by a terminal at one of the endpoints, from a policy enforcement function (PEF) a QoS managed bearer;
checking the requested QoS with a PEF side policy decision function (P-PDF) to determine if the requested QoS falls within a current policy;
determining, by the P-PDF, that the terminal is roaming based on identification information and contacting the A-PDF in the home network, also based on the identification information;
determining, by the A-PDF, the home network policy based on AF inputs and providing the home network policy to the P-PDF;
determining, by the P-PDF, the home network policy based on AF inputs and providing the home network policy to the PEF;
responding, by the PEF, if the home network policy is to allow the end-to-end multimedia session, with a success to the terminal; and
creating a bearer for the end-to-end multimedia session;
wherein a secure inter-domain protocol supports an interconnection of the A-PDF and the P-PDF so that only the A-PDF and the P-PDF need communicate between the home network and a visited network; and
wherein QoS requested at a session layer is correlated with actual QoS provided at a bearer layer using a linkage between the session layer and the bearer layer.

19. The method according to claim 18, wherein the determining, by the P-PDF, the home network policy step is based on AF inputs and is also modulated by local network policy.

20. The method according to claim 18, wherein local network policy is based on at least one of resource utilization needs and roaming agreements.

* * * * *